UNITED STATES PATENT OFFICE.

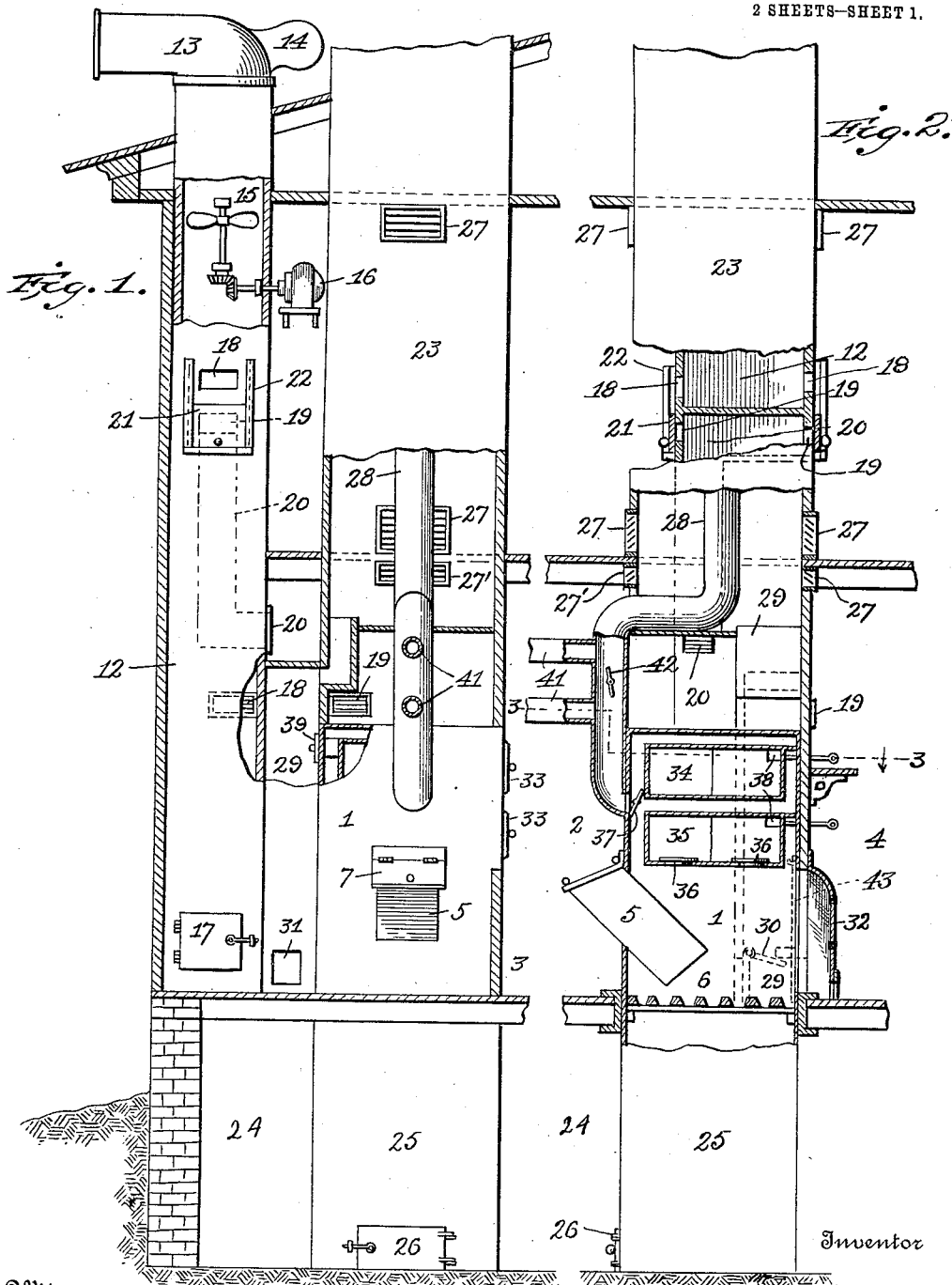

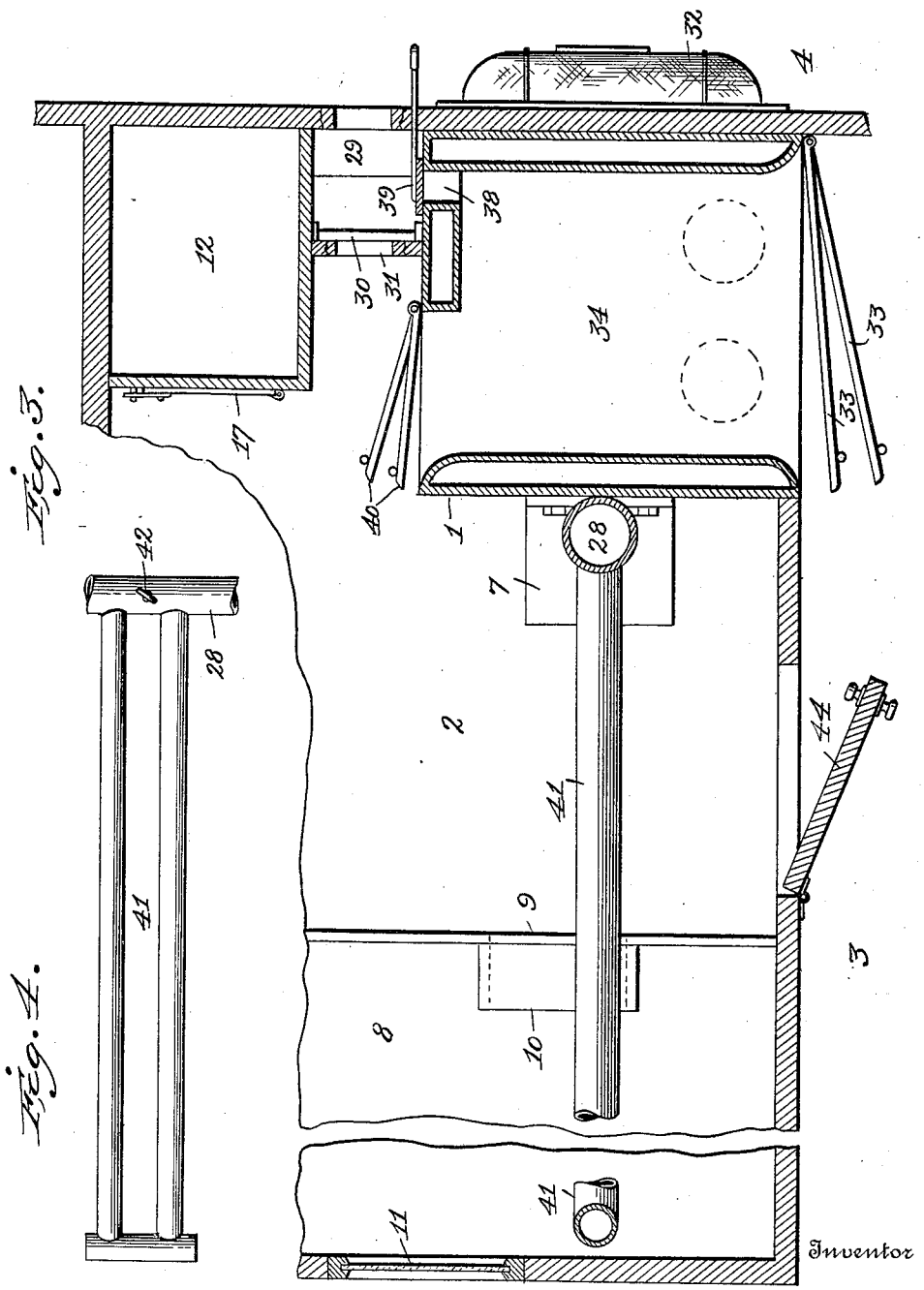

LYMAN PAUL ARMSTRONG, OF SAN JOSE, CALIFORNIA.

SYSTEM OF HEATING AND VENTILATING.

1,000,065. Specification of Letters Patent. Patented Aug. 8, 1911.

Application filed April 8, 1910. Serial No. 554,247.

*To all whom it may concern:*

Be it known that I, LYMAN P. ARMSTRONG, a citizen of the United States, residing at San Jose, in the county of Santa Clara and State of California, have invented new and useful Improvements in Systems of Heating and Ventilating, of which the following is a specification.

This invention relates to systems of house heating and ventilation, and its object is to combine in one structure a hot air furnace, a cook stove and a heating grate having the effect of an open fire. In addition thereto, I provide for automatically drawing fresh air into the house and carrying off the foul air, both in winter and summer.

The nature of my invention and the mode in which I prefer to carry it out will appear from the following detailed description taken in connection with the accompanying drawings, in which—

Figure 1 is a side elevation partly in section of my improved combined heating, cooking and ventilating system. Fig. 2 is a front elevation partly in section. Fig. 3 is a horizontal section on the line 3—3, Fig. 2, on a larger scale, and Fig. 4 is a side elevation of the heating pipe.

In the system illustrated, the furnace 1 is located in the angle of the furnace room 2 next to both the kitchen 3 and the living room 4. Said furnace is preferably of the magazine type, the fuel being fed in through a chute 5 which inclines downwardly toward the grate 6, its upper end being closed by a lid 7 in the furnace room. Convenient to this chute is the coal bin 8, whose outlet 9 is provided with a hood 10 inside the bin to keep the coal from running out too rapidly. Any other fuel preferred may be used.

The furnace room is lighted by a window 11, which may in case of necessity be used to supply fresh air to said room. I prefer, however, to make use of a fresh air duct 12 extending from the furnace room to the top of the house, where it is provided with a rotatable cowl 13 having a vane 14 which keeps the mouth turned always toward the wind, so as to produce a positive down draft in the duct. In case of necessity, a small fan 15 may be introduced into the duct, driven by an electric or other motor 16. The fresh air enters the furnace room through a door 17, which can be opened more or less as desired. In each room above or adjacent to the furnace room, the fresh air duct is provided with a register or opening 18, a short branch pipe being used where required. Immediately below each opening 18 is a similar opening 19 from a flue 20 which starts in the upper part of the furnace room, and delivers about half way up the wall of each apartment the air heated in the furnace room. As many such flues may be provided as are desired. By locating the hot air opening 19 adjacent to the cold air opening 18 they can be simultaneously controlled by a shutter 21, which preferably slides in ways 22 and is adapted to close one or the other opening completely, or partially close both, according to the position to which it may be adjusted. In fact it is the ordinary modern furnace arrangement except that the furnace is brought to the level of the living rooms, and the fire made visible in one room and available for cooking in another, while the whole furnace room serves as a jacket to the furnace and the hot air may pass directly from said furnace room or jacket through registers or windows 19 in the walls of said room to one or more adjacent rooms of the building. Adjacent to these registers are registers 18 connecting with the fresh air duct.

A ventilating flue 23 rises from the cellar 24 to the top of the house where it is open to the atmosphere, its lower part preferably inclosing the furnace, below which it serves as an ash pit 25, provided with a clean-out door 26. Registers 27 open into the flue 23 both at the bottom and the top of each room adjacent to said flue, so that foul air will be drawn off thoroughly from all parts of the house. In order to create a draft up through said flue, the smoke pipe 28 of the furnace is led up through it, thereby warming the air in said flue and causing it to rise to the outlet at its top above the roof of the house. The inlet to the ventilating flue from the lower part of the living room is by means of a duct 29, at the bottom of which is a damper 30 controlling both the flue and an opening 31 into the furnace room, so that when desired the cold air on the floor of the living room can be shunted from the ventilating flue to the furnace room and warmed therein, to be added to the supply of fresh air coming down through the duct 12. The duct 29 is located between the fresh air duct 12 and the furnace, and its upper end is off-set a little to enable it to connect with the lower end of the ventilating flue, as shown in Fig. 1.

One side of the furnace projects through the wall of the furnace room into the living room, and is there provided with a glazed front 32, which affords a view of the fire to the occupants of the living room and thereby produces a cheerful aspect. If desired, this portion of the furnace can be framed in as a fire-place, with a mantel piece above. Another side of the furnace opens into the kitchen, and is provided with oven doors 33 giving access to the ovens 34, 35. The lower oven 35 has holes in its bottom, covered by removable lids 36, like stove lids, so that broiling and other operations can be carried on over the open fire, as in a range. The smoke pipe 28 starts just above the lower oven and is carried up past the upper oven 34 to the ventilating flue. This upper oven is double-walled, as shown, and a damper 37 is arranged at the base of the smoke pipe, so that if desired, the smoke and hot products of combustion can be made to traverse the space between the walls of the upper oven before reaching the smoke pipe. By adjusting this damper, the heating of the upper oven can be easily regulated.

At the back of each oven is a port 38 controlled by a damper 39, and opening into the duct 29 communicating with the ventilating flue, so that smoke, steam or gases arising from the cooking foods can be drawn off. Doors 40 may also be provided at the back of the ovens to admit the heat therefrom to the furnace room when the ovens are not in use for cooking purposes, and in this way assist the furnace in heating the adjacent and upper rooms. As a further means for heating the furnace room, I provide a long loop of pipe 41 connected to the smoke pipe at two points one above the other, with a damper 42 between, by means of which the hot products of combustion from the furnace can be caused to traverse the loop before entering the upper part of the smoke pipe. The radiating surface of the loop is so great that it quickly heats the air in the furnace room, and thus materially aids in heating the dwelling.

For use in hot weather, a register 27' into the vent flue (shown in Figs. 1 and 2) is placed next the ceiling of the furnace room to carry off cooking heat and make it increase the suction of the flue for drawing off air from all rooms. And to prevent radiation into the living room, an inner screen 43 of asbestos is then placed inside the glazed front 32. A door 44 affords access from the kitchen to the furnace room, so that the cook can easily feed the fire when necessary.

Having thus described my invention, what I claim is:

1. A dwelling having a living room, a kitchen adjacent thereto, and a furnace room adjacent to both, and a furnace in the furnace room having a glazed front extending into the living room, and provided with ovens accessible from the kitchen.

2. A dwelling having several apartments including a furnace room, a furnace in said furnace room, a fresh air duct leading from the top of said dwelling to said furnace room, a ventilating flue running from said furnace room to the top of the dwelling, a smoke pipe extending from said furnace up through said ventilating flue, registers opening from the several apartments into said ventilating flue, other registers opening from the several apartments into said fresh air duct, flues for conveying hot air from said furnace room to the several apartments, registers in said hot air flues adjacent to those in the fresh air duct, and a common controlling device for said hot air and fresh air registers.

In testimony whereof I have signed my name to this specification in the presence of two subscribing witnesses.

LYMAN PAUL ARMSTRONG.

Witnesses:
L. IRENE WALLIS,
J. W. HAWKINS.